United States Patent [19]

Homer

[11] Patent Number: 4,888,989
[45] Date of Patent: Dec. 26, 1989

[54] LEVEL SENSOR SYSTEM
[75] Inventor: John C. Homer, Chardon, Ohio
[73] Assignee: General Signal Corporation, Stamford, Conn.
[21] Appl. No.: 833,942
[22] Filed: Feb. 26, 1986
[51] Int. Cl.[4] .................. G01F 23/00; G01F 23/26
[52] U.S. Cl. .................................. 73/304 C; 210/86; 376/258; 377/19
[58] Field of Search .................. 73/304 C; 361/284; 377/19; 210/86; 326/258

[56] References Cited

U.S. PATENT DOCUMENTS

| | | | |
|---|---|---|---|
| 2,651,204 | 9/1953 | Dickinson | 377/19 X |
| 2,700,901 | 2/1955 | Rickner | 361/284 X |
| 2,919,579 | 1/1960 | Gronner | 73/304 C |
| 3,189,268 | 6/1965 | Nilsson | 210/86 X |
| 4,010,650 | 3/1977 | Piatkowski, Jr. | 73/304 C |
| 4,021,707 | 3/1977 | Ehret | 73/304 C X |
| 4,031,007 | 6/1977 | Sierra, Jr. | 210/86 X |
| 4,214,479 | 7/1980 | Maier | 73/304 C |
| 4,412,270 | 10/1983 | Wertz, Jr. et al. | 361/284 |
| 4,417,473 | 11/1983 | Tward et al. | 361/284 X |
| 4,525,850 | 6/1985 | Miller | 377/19 |
| 4,541,105 | 9/1985 | Lee et al. | 377/19 |

FOREIGN PATENT DOCUMENTS

| | | |
|---|---|---|
| 1498404 | 12/1968 | Denmark . |
| 3046915 | 12/1980 | Denmark . |
| 3133239 | 8/1981 | Denmark . |
| 2405469 | 9/1978 | France . |
| 0120665 | 6/1927 | Switzerland ............ 361/284 |
| 2097129 | 3/1982 | United Kingdom . |

Primary Examiner—Daniel M. Yasich
Attorney, Agent, or Firm—Martin LuKacher

[57] ABSTRACT

A level sensor system for liquids and liquid slurries utilizes a capacitive probe which extends longitudinally into a liquid or liquid slurry containing vessel, and which may contain inner and outer sensors spaced from each other in an assembly with a flow control screen at its lower end to permit egress of liquid and exclusion of the solid slurry material, thereby enabling both liquid and slurry level to be determined. The capacitance presented by each sensor is converted into a digital output in repetitive cycles having a reference phase, where a reference voltage is generated by charging a reference capacitor while a counter is registering counts and until a pre-determined count is reached, and in a computing phase while counts are accumulated until the capacitance presented by the probe charges to a voltage equal to the reference voltage. The counts registered in the counter may be converted into level units and displayed or the difference between the liquid and slurry levels may be used to control a fluid system, as in the de-watering of waste, ion exchange resins and other waste filter media and sludges used in decontamination, water treatment in nuclear power plants.

20 Claims, 3 Drawing Sheets

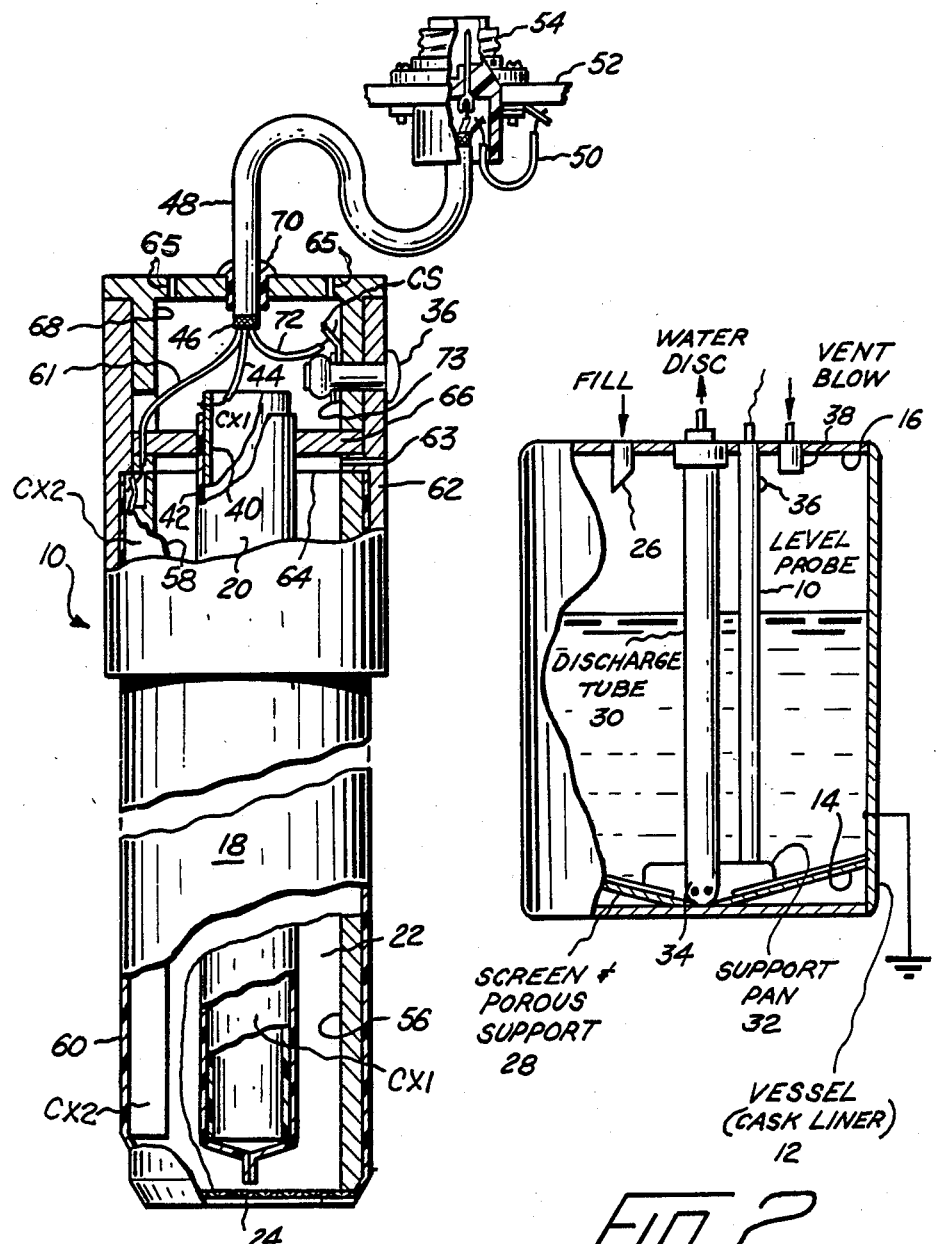

LEVEL SENSOR SYSTEM

The present invention relates to level sensor systems, and particularly to systems for sensing and measuring the level of liquids and liquid slurries in vessels.

The present invention is especially suitable for use in apparatus for the de-watering of waste material used in nuclear power plants, such as ion exchange resin, filter media and sludges which have low levels of radioactivity and must be depleted of freestanding water prior to burial in vessels known as cask liners. The level sensor system may also be used in other applications wherever measurement of the level of liquids and/or liquid slurries is needed.

It is desirable to measure the amount of freestanding water in the liner vessel so as to ensure that the requirements of governmental regulations are met. Because the materials in the liner are radioactive, it is desirable that the level sensor assembly which is installed in the liner be sufficiently low in cost that it may be disposable with the filled liner at the burial site. An alternative is not to use a level sensor, and allow the de-watering process to continue for a prolonged period of time necessary to assure that water has drained from the waste material in the liner. The need for such long term processes has increased the cost of nuclear waste disposal, let alone unnecessary personnel exposure and the risk that sufficient water will be present in the liner to cause its deterioration and increase the risk of release of radioactive waste into the environment.

The control systems for the de-watering also require a high degree of level measurement precision and resolution, which exacerbates the problem of providing a low cost, disposable sensor system. Accuracy of measurement is also needed for level sensing applications in processes other than nuclear waste de-watering.

Another problem arises from the need to measure the liquid level in a liquid slurry or suspension independent of the level of the solid materials therein. A still further problem is to provide a sensor package which does not occupy a large amount of space. The solution to this problem is particularly relevant in the case of nuclear waste disposal, since the cost of disposal by burial is measured by the volume utilized by the liner or other burial device carrying the nuclear waste.

Accordingly, it is the principal object of the present invention to provide an improved sensor system for sensing the level of liquids and/or liquid slurries which may be implemented at low cost and which has the necessary precision and provides sufficient resolution in operation.

It is a further object of the present invention to provide an improved level sensor probe which may be implemented at low cost so that it may be disposable together with the material, the level of which it measures, such as nuclear waste material.

It is a still further object of the present invention to provide an improved sensor system for measuring liquid and/or liquid slurry levels which is capable of measuring the level of liquid in a vessel independent of the level of the liquid slurry therein.

It is a still further object of the present invention to provide improved level sensor systems which operate with capacitive probes and provide measurement precision and resolution notwithstanding system perturbations, such as stray capacitance affecting the probe.

It is a still further object of the present invention to provide improved sensor systems for liquid and/or liquid slurry level measurement and detection wherein the above discussed problems are obviated.

Briefly described, the invention provides sensors which present an output capacitance corresponding to the level of the material in a vessel. The vessel and the material therein are conductive and the probe has a member which extends longitudinally in the vessel and supports a conductive element in insulating relationship with the material in the vessel. The conductive element provides a plate of a capacitor. Another member, which supports a conductive member which provides the plate of another capacitor, may be used to provide a probe assembly for independently measuring the level of liquid material from the slurry material in the vessel. The members are disposed to define a space therebetween which is closed except for a flow control element, such as a screen at the bottom of the space which provides means for controlling flow into the space from the vessel. A vent near the top of the space allow for the of trapped air. Liquid passes through the screen and into the space. The output capacitance of one of the probes corresponds to the liquid level in the space, while the output capacitance of the other probe corresponds to the level of the slurry. Differences in liquid and slurry level may be detected and used to control the filling of the vessel; for example, to maintain liquid above the level of a slurry of spent ion exchange resin beads so as to promote their settling into a compact array to facilitate de-watering.

The system converts the output capacitance presented by the probe or probes into a digital output having a value corresponding to the output capacitance and in relation to a reference capacitance. A counter is used for providing the digital output. A reference voltage is generated corresponding to a predetermined count registered in the counter and to a predetermined level of material in the tank. An output voltage is generated corresponding to the value of the output capacitance. While the output voltage is generated, counts are registered in the counter. The digital output from the counter, corresponding to the output capacitance and the level of the material in the vessel, is obtained when the output voltage corresponding to the value of the output capacitance equals the reference voltage. The count may be inhibited until an output voltage corresponding to the stray capacitance in the system reaches the reference voltage. The reference voltage is obtained by charging a reference capacitor during an initial phase of a measurement cycle to obtain the reference voltage. Charging of the output capacitance and stray capacitance presented by the probe occurs during a measurement phase of the cycle; the reference capacitor being discharged at the end of the reference phase and the output capacitance and stray capacitance being discharged at the end of the measurement phase.

The foregoing and other objects, features and advantages of the invention, as well as the presently preferred embodiment thereof, will be more apparent from a reading of the following specification in connection with the accompanying drawings in which:

FIG. 1 is an elevational view of a dual level probe embodying the invention;

FIG. 2 is an elevation view, partially in section, of a cask liner vessel equipped with the level probe shown in FIG., 1 and other devices for the de-watering of spent ion exchange resin with which the vessel is filled;

Figure 3:
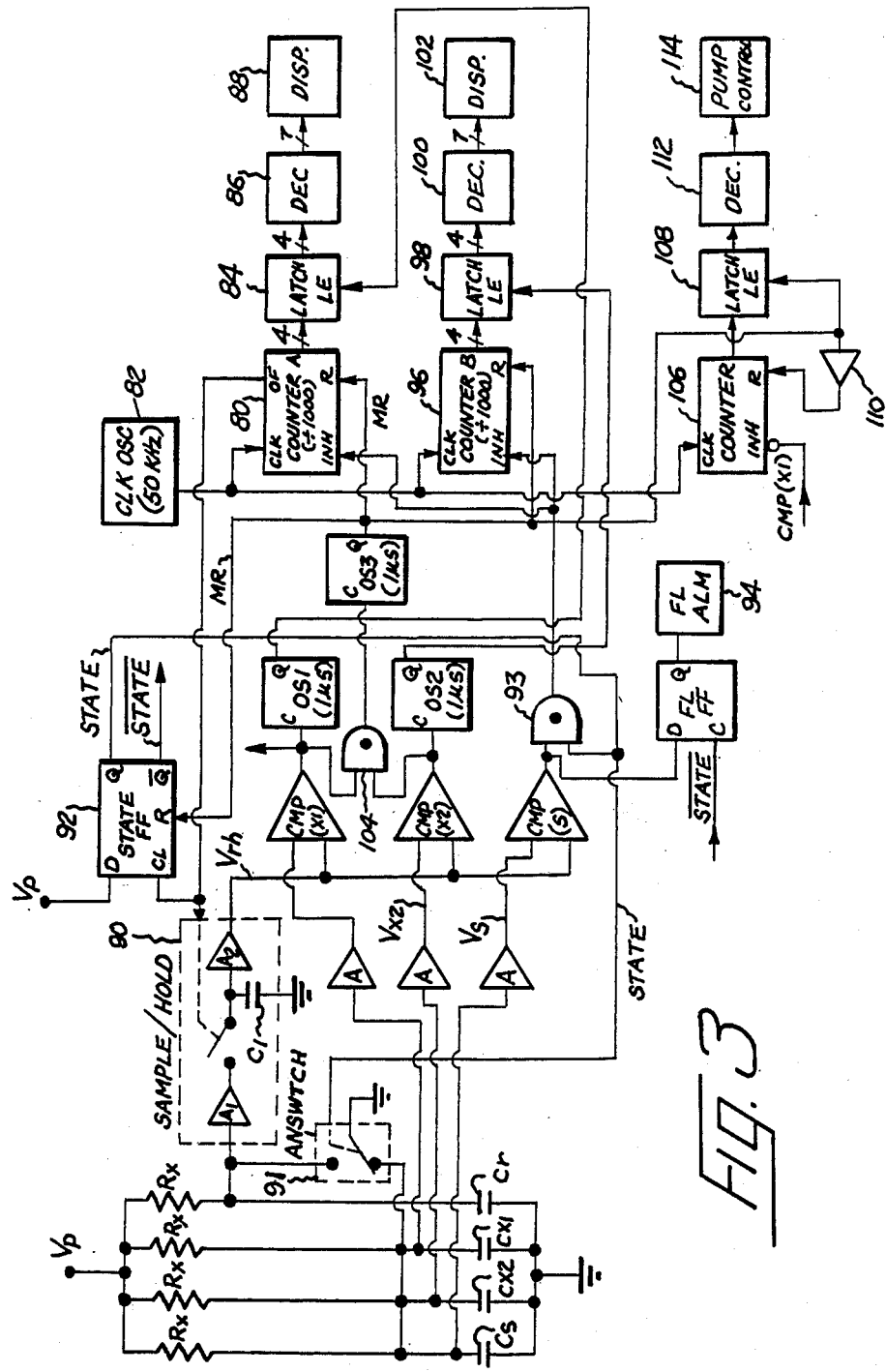
FIG. 3 is a schematic diagram of the sensor system embodying the invention.

Referring first to FIG. 1 there is shown a disposable level sensor probe 10 which is shown mounted in a cask liner vessel 12 in FIG. 2. The probe extends longitudinally in the vessel so that it can provide measurement of the level all the way from the conical bottom 14 of the vessel to the top 16 thereof. The probe 10 has two level sensor probes 18 and 20 in one assembly. The sensor 20 is inside the sensor 18 and defines space 22 therebetween. Flow control means in the form of a screen 24 allows the egress of water into the space 22 while excluding the solid materials. Air displaced by water in space 22 exits through vent 63. The inside sensor 20, therefore, measures the level of water while the outside sensor 18 measures the level of the slurry.

During de-watering, the cask liner vessel (also referred to as the "liner") 12 (FIG. 2) is filled with the slurry, for example, spent ion exchange resin beads and water. The slurry enters through the fill pipe 26 and settles on a screen and porous support 28, which may be a conical member disposed on the conical bottom 14. A discharge tube 30 and the level probe 10 are supported on an inverted support pan 32 which rests on the porous support 28 and conical bottom 14. The discharge tube is centered at the apex of the conical bottom 14 and has openings 34 which allow the egress of water collected in a sump region at the apex of the conical bottom 14. This water passes through the screen and porous support 28, which excludes the passage of the solid material (the resin beads). The water is discharged through the discharge tube 30 which is connected through suitable hosing to a pump.

It is desirable that the resin beads be allowed to settle under water. Accordingly, after an initial fill of the liner, the water is pumped out through the discharge tube 30 until the level probe indicates that the solid material level is above the water level. Then additional slurry is supplied through the fill pipe 26 until the water level exceeds the level of the resin beads. On the initial fill and each subsequent fill the vessel is fully filled as indicated by the level probe. To this end a high level sensor is provided by a terminal 36 which is contacted by the slurry when the vessel is filled to a predetermined high level.

The filling and discharge process is repeated until water removal will no longer eliminate the high level condition. Because resin beads are allowed to settle under water they are permitted to arrange themselves, as close as possible in a close packed array, which is the condition that is most efficient for the utilization of the liner volume. This condition also maximizes contacts between the beads at 3 points between vertically adjacent beads. Such contact maximizes the flow path for water to the bottom 14 of the liner.

A vent pipe is connected to a coupling 38 at the top 16 of the liner 12. The pump, preferably a positive displacement pump, continues to draw water from the sump region at the bottom 14 of the liner. Once suction is broken to the pump, a period of from 5 to 15 minutes of drain is allowed, and the pump is then again turned on to withdraw whatever water has accumulated in the sump. Then a blower, preferably which can transfer air at a rate at or above 300 cubic feet per minute and develop about 10 inches of mercury pressure across the liner, is turned on. Air flow is then provided from the top of the bed of material (resin beads), through the bed to the sump and back through the water discharge tube 30, back to the blower. The top region of the liner to the top of the bed is held near atmospheric pressure. This avoids overstressing the materials in this region. The sump region pressure at the conical bottom 14 drops due to the air flow.

The flow of air through the bed, and particularly through the interstices in the resin beads, pushes water away from the areas of point contact of the beads and downward to the sump region where the water is atomized by the high velocity air which exits via the holes 34 in the discharge tube 30. Without the airflow water moves downward due to the force of gravity but such movement is impeded by water viscosity and water surface tension thereby requiring several days to reach an equilibrium state which is still of greater water content than when air is used for a few hours. The water may be separated from the transport air by external equipment, such as a cyclone separator. The air discharged from the separator may then be returned to the blower. When the air returns to the vent/blow connector pipe 38, it has lost most of the water and has gained heat due to compression at the blower. The warm air also assists in de-watering since it is capable of holding more water, lowers the water viscosity and dehydrates the material near the upper part of the bed and redeposits the moisture further down in the cooler portion of the bed where it is pushed along by the cooled air until it reaches the sump region. The foregoing process is described in greater detail in my application Ser. No. 06/833,943 filed concurrently herewith, and now U.S. Pat. No. 4,836,934.

The de-watering process from the beginning of the repetitive fill cycles through the air de-watering cycles enables the material in the vessel to be de-watered in approximately 4 hours. Then there is no detectable water in the sump and the water level is below that required by regulations before the liner 12, filled with spent material can be buried at the burial site. The level probe is disposable. It is buried with the liner. Hence it can be used at any time after de-watering until burial to inspect and assure regulatory limits of free water are being met Referring again to FIG. 1, the inner sensor or probe 20 is provided by a member which extends longitudinally from the top to the bottom thereof. This member is preferably a tube 40 of conductive material. It may be a solid, cylindrical rod as an alternative. A tube is preferred. This tube presents a cylindrical conductive surface extending longitudinally in o the vessel 12. An insulating layer 42 is disposed on the outer periphery of the tube 40 and covers its conductive surface, except immediately at the top of the tube 40 where a connection 44 is made, leading through a conductive mesh tube 46 (an electromagnetic shield) covered by an insulating jacket 48 to provide a cable. The shield 46 may be grounded by a wire 50 to a plate 52 which supports an electrical connector 54. The plate 52 may be the top 16 of the liner 12 (FIG. 2).

The insulating layer 42 has its interior surface over the conductive surface of the tube 40. The layer is preferably provided by a PVC (polyvinyl chloride) jacket which is shrink-fitted tightly over the outer peripheral surface of the tube 40. Other appropriate materials, such as nylon, polyolefin or polypropylene may be used. The polyvinyl jacket which provides the insulating layer 42, is also sealed at the bottom to close the bottom of the tube 40. The outer sensor or probe 18 has a cylindrical tube 56 of insulating material, such as a plastic, PVC acrylic or rigid polyethlene being suitable. A foil 58 of conductive material, preferably copper, is wrapped over a portion of the outer peripheral surface of the insulating tube 56. The foil 58 provides a conductive element and is of a length about the same as the length of the conductive cylinder 40 of the inner sensor 20. The bottom of the conductive element 58 is approximately in the same horizontal plane as the bottom of the conductive tube 40. Preferably, the area of the foil 58 wrapped around the outer periphery of the tube 56 is mathematically equivalent to the conductive surface area of the inner sensor tube 40. The foil conductive element 58 is covered by a layer 60 of insulating material. Preferably, this layer is formed by another PVC jacket which is shrink-fitted tightly over the cylindrical tube 56. The bottom of the cylindrical tube is closed by the flow control screen 24. A vent 63 for the air displaced by water from the space 22 is also provided.

A lead 61 is connected at one end to an extension of the conductive foil 58. The lead 61 is brought through the shield sleeve 46 and insulation jacket 48 to a contact of the connector 54.

The inner sensor 20 and the outer sensor 18 are assembled together by a tubular coupling 62 having an internal flange which forms a ring 64. A hole through the flange 64 provides the vent 63. A disc 66 is attached, as by gluing near the top of the inner sensor 20. The disc 66 is supported on the flange 64. A tubular cap 68 is inserted into the coupling member 62 and extends to the top of the disc 66, thereby sandwiching the disc between the bottom of the cylindrical portion of the cap 68 and the flange 64. The cap has holes 65 for receiving screws or other fasteners to hold the assembled level sensor probe in place, for example to the cover 16 of the cask liner vessel 12 (FIG. 2). The conductive terminal 36 is in the form of a rivet and detects when the vessel 12 is filled to a predetermined high level, the conductive rivet extends through the cylindrical portion of the cap 68 and the coupling cylinder 62. The rivet holds a connecting ring 73 to which a lead 72 is attached. The lead is brought out through the shield sleeve 46 and the insulating jacket 48 (together with the other leads 44 and 61) to a contact of the connector 54.

The abutting surfaces of the coupling cylinder 62, the disc 66 and the cap 68 as well as the surfaces of the coupling cylinder 62 which join the insulating PVC jacket 60 of the outer sensor 18 may be held in place by glue. Prior to final assembly the interior cavities of the assembly, where the extension of the foil element 58 is connected to the lead 61 and which are defined by the interior surface of the cap 68 of the upper surface of the disc 66, may be filled with insulating material such as epoxy potting compound (not shown). The potting compound may be injected through one of the holes in the cap 68. The grommet 70 protects the cable carrying the leads 44, 61 and 72 to the connector 54.

The conductive surface of the tube 40 of the inner sensor defines one plate of a capacitor. The dielectric of the capacitor is provided by the insulating layer 42. The second plate of the capacitor is the water in the space 22 between the exterior surface of the insulating layer 42 and the inner surface of the insulating tube 56 of the outer sensor 18. This space is an annular space, suitably of one inch to one and one-half inch in width, radially. The interior cylindrical center 20 and the exterior cylindrical center 18 are coaxial, and the radial distance is measured perpendicular to their common axis.

The conductive element 58 defines the plate of a second capacitor. The insulating layer 60 defines the dielectric of the second capacitor. Slurry external to the layer 60 forms the second plate of the second capacitor. The capacitance of these capacitors is indicated as Cx1 in the case of the inner sensor and Cx2 in the case of the outer sensor 18.

Insofar as the interior sensor 20 is concerned, the low dielectric constant of air in the space 22 and the large thickness of the insulating tube 56 of the exterior sensor results in a very small capacitive gradient as a function of the wet solid material external to the inner sensor. When water is present in the space 22, the capacitive gradient is even several orders of magnitude greater than without the presence of water. The water which is conductive and the vessel wall which is grounded provide the second plate of the capacitor. The capacitance is a function of the water level in the space., Thus the sensor has continuous measurement capability. The effect of the structure of the outer sensor 18 has very little influence on the inner sensor 20.

Alternatively, the level of the solid material may be measured with another sensor (in lieu of the outer sensor 18 with the copper foil plate 58) which is identical to the inner sensor 20 and located external to insulator 56 where the inner sensor is then located in a manner to exclude solids so as to be responsive only to the water level. The coaxial structure as illustrated herein is more efficient in the utilization of space and makes use of a shield tube 56 which would nevertheless be required so as to enable one of the sensors to be responsive only to the water level.

Since the conductive element 58 of the outer sensor presents the same (mathematically equivalent) area as the conductive outer peripheral surface of the tube 40 of the inner sensor 20, the capacitance of the inner or water level sensor will match that of the outer or wet solids (e.g. resin beads) level sensor when the levels are the same. However, when the water is being discharged from the liner 12 during de-watering operations, a difference between the capacitance presented by the two sensors develops when the water level drops below that of the solids containing material.

The terminal 36 will make conductive contact with the solids containing materials when they reach the high level point. This contact is used as a high level indication. Of course, the level sensor probes themselves may be used to determine when the high level is reached. The terminal 36 provides an alternative (and another) means to measure a high level condition and its lead also provides an output corresponding to the stray capacitance in the system. This stray capacitance is indicated as Cs.

The conversion of the capacitances into digital outputs which correspond to the value of these capacitances (Cx1, Cx2 and Cs) and which also correspond to the water and solids containing material levels in the vessel and to the stray cable capacitance are obtained using the electrical portion of the system shown in FIG. 3.

The capacitances Cx1, Cx2 and Cs and a reference capacitor Cr are charged from a common source of voltage $V_p$, through resistors Rx of identical resistance value, to obtain voltages corresponding to the capacitance and time of charging. The reference capacitor is charged during a reference phase of each measurement cycle and the measuring capacitors, provided by the output capacitances Cx1, Cx2, and Cs are charged during a conversion or compare phase of the measurement cycle. (See FIG. 4). The measurement cycles repeat continuously and the level measurements are updated on each cycle. The cycle is controlled by a counter 80, also labeled counter A, which counts clock pulses from a clock oscillator 82. The counter is suitably a divide by 1000 counter which counts from zero to 999 and then recycles. The clock pulses may suitably be 50 KHz in frequency. The counter has a clock input (CLK) an overflow output (OF) and an inhibit (INH) input which prevents counting when the level applied to that input is high. The counter produces a BCD (binary coded decimal) output which is presented to a latch 84 which holds the BCD signal when a latch enable level (LE) is applied thereto. The BCD output latched in the latch 84 is decoded in a decoder 86 and then applied to a display 88. The display may be a multi-segment LED (light emitting diode) display of the conventional type. It is this display which will be updated each measurement cycle.

Figure 4:
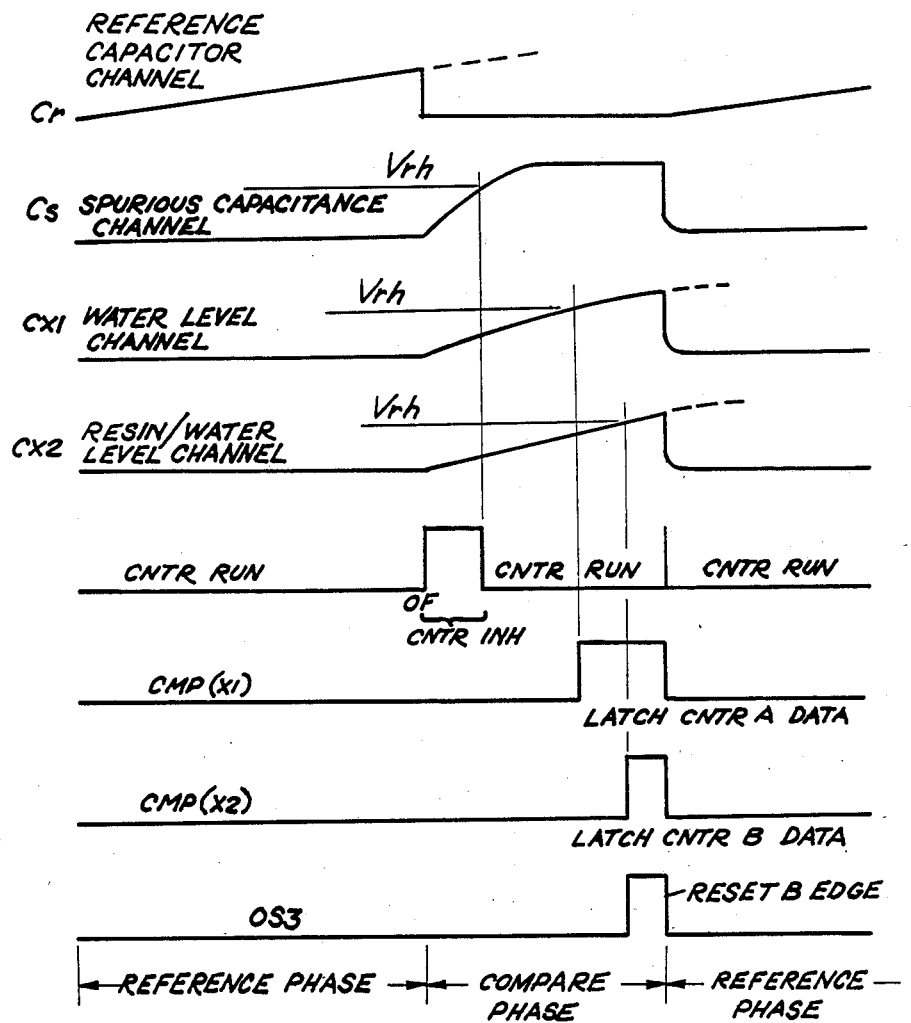
FIG. 4 is a timing diagram showing wave forms of voltage levels at several different points in the system illustrated in FIG. 3.

As the first waveform identified as "Cr, Reference Capacitor Channel" in FIG. 4 indicates, the voltage across the reference capacitor Cr increases as the capacitor is charged during the reference phase and while the counter 80 is counting from zero to 999. When the counter reaches 999, the overflow pulse is outputted. This pulse operates a sample and hold circuit 90 having input and output amplifiers A1 and A2 and a holding capacitor C1, as is conventional, during the overflow pulse (one pulse (a half cycle) of the clock oscillator). The sample is taken and provides the reference voltage Vrh. The reference voltages generated while the counter is registering counts. The overflow pulse also clocks logic means provided by a STATE flip-flop 92 which is a D-type flip-flop adapted to be conditioned into either of two output states. The Q output of the flip-flop 92, indicated as "STATE", then goes high, on the fall of the overflow pulse. The STATE level going high (one of these output states) operates an analog switch (ANSWTCH) 91 which removes ground from the measuring capacitors Cx1, Cx2 and Cs and connects the reference capacitor Cr to ground where the reference capacitor then discharges and the measuring capacitors are allowed to charge. The counter is registering counts during the charging of the measuring capacitors.

Because capacitors Cx1, Cx2, Cs and Cr receive charging current from the same source, namely Vp, and because both the reference and compare cycles are referenced to the same clock 82, nominal drift of either Vp or the clock frequency have virtually no effect on the precision of measurement. The most significant source of measurement error lies with the sample and hold 90, storage capacitor C1 (a part of 90), and the input impedances of amplifiers (A1 and A). These components are chosen so as to reduce loading differences between inputs. For example, amplifiers (A) are selected for high input impedance and low offset voltage, capacitor C1 is selected for low leakage current and low dielectric absorption and the errors possible from the sample and hold 90 and capacitor C1 is further minimized by the high cycle rate imposed by the 50 KHz clock.

The output voltages from the capacitors are applied via high input impedance amplifiers (A) to comparators CMPX1, CMPX2 and CMPs. The output voltages Vx1, Vx2 and Vs are applied to the comparators. When Vx1 equals Vrh the comparator provides an output to the clock input of a one-shot multi-vibrator Os1. This multi-vibrator outputs a pulse (one microsecond in duration) to the latch enable input of the latch 84. The count in the counter is then latched and displayed. Thus, the count registered in the counter during the compare cycle (i.e. until the output voltage equals the reference voltage) is related to the level of material in the vessel which determines the capacitance, as these counts are related to the predetermined count (1,000) registered during the reference cycle. The effect of the stray capacitance is deducted utilizing the output from the comparator CMPs. When the voltage Vs corresponding to the stray capacitance equals the reference voltage Vrh, the comparator CMPs provides an output. This output is utilized only during the measurement phase. Then, AND gate 93 is enabled to transmit this output when the state flip-flop is set (the STATE output is high). Only then will the counter 80 be enabled to count during the compare phase. The counts due to the stray capacitance contained in the Cx1 capacitance are therefore deducted.

The output of the comparator CMPs may also be used to indicate high level by means of another D flip-flop indicated as the FLFF or full level flip-flop. Under high level conditions, capacitor Cs is short circuited to ground by water in liner 12 and Vs will remain at zero. The leading edge of the NOT STATE level occurs at the beginning of the reference phase, just before Cs is normally discharged. If Cs then has not charged to Vrh, the comparator CMPs output to the D input of FLFF will be high. FLFF then is set on the rise of the NOT STATE signal and the full level alarm (FLALM) 94 is actuated. This full level alarm 94 may be used to stop the pump which is filling the vessel 12 (FIG. 2) with slurry.

The system has a second channel using the outer sensor capacitance Cx2. The second channel has a counter 96, also labeled counter B, similar to the counter 80 and also a latch 98, decoder 100 and display 102 similar to the latch 84, decoder 86 and display 88 in the water level sensor channel. The counter 96 counts the same clock pulses from the oscillator 82 as does the counter 80. When the output voltage Vx2 to which the outer level sensor capacitor Cx2 charges equals the reference voltage Vrh, the comparator CMPX2 goes high and clocks another one shot Os2. This one shot Os2 is similar to Os1 and produces a pulse which enables the latch 98 to latch the BCD output of the counter 96. The counter 96 may also be inhibited by the stray capacitance channel so as to deduct the effect of the stray cable capacitance from the count registered in the counter 96.

Another AND gate 104 is enabled when both comparators CMPX1 and CMPX2 are high. The leading edge of the output from the AND gate 104 clocks a one shot multi-vibrator Os3 which produces an output pulse somewhat wider than the output pulses from the latch enabling one shots Os1 and Os2. The trailing edge of this wider pulse is used as a master reset pulse and is applied to the counters 80 and 96 to reset the counters and also to the reset the STATE flip-flop 92. On occurrence of the reset, another measurements cycle commences with its reference phase.

The operation of the system is apparent from the waveforms shown in FIG. 4. They show the case where the water level is lower than the solids containing material (resin/water) level. The stray capacitance Cs is smaller than any other of the capacitances and reaches the reference voltage Vrh first. The counters 80 and 96 are allowed to run after the stray capacitance has charged to the reference level. Since the water level is lower, its capacitance Cx1 is lower and it charges to reference level before the resin/water level (outer sensor) capacitor Cx2. The comparator CMPX1 output goes high before the comparator CMPX2. The latch enable pulse is generated concurrently with the leading edge of the comparator output pulses. The count registered in the water level channel, level counter 80 (A), is then latched first. The count registered in the resin/water level channel counter 96 (B) is then latched. The gate 104 clocks Os3 when both comparators CMPX1 and CMPX2 have high outputs. The master reset is generated at the trailing edge of the Os3 output pulse.

In order to automatically switch on and off the pumps which remove the water through the discharge tube 30 (FIG. 2) and supply additional fill slurry, the level differential of water below resin/water slurry, if any, can be obtained using another counter 106. This counter may also be a divide by 1000 counter which counts the clock pulses from the clock oscillator 82. The counter 106 is reset at the end of the compare phase and enabled to count while the water level sensor output is high. This condition occurs for a significant time before master reset only if the water level is lower than the resin/water level presented to the outside sensor 18, because the capacitance Cx1 of the inside sensor 20 is then lower and charges faster as illustrated in FIG. 4. A latch 108 is enabled slightly before the counter 106 is reset due to the delay in an amplifier 110. A decoder 112 detects a count corresponding to a predetermined water level greater than the solids containing (resin/water) level and then outputs a control pulse to a pump control 114. This pump control then stops the discharge pump and may be used to start the fill pump if its not running.

From the foregoing description, it will be apparent that there has been provided an improved level sensor system which is especially suitable for use in the dewatering of spent nuclear waste material. While a preferred embodiment of the system has been shown, it will be appreciated that modifications and variations thereof, within the scope of the invention, will undoubtedly suggest themselves to those skilled in the art. Accordingly, the foregoing description should be taken as illustrative and not in a limiting sense.

I claim:

1. Apparatus for sensing the level of flowable material in a vessel which comprises first and second members to sense two fluidic levels, said first member having a top and a bottom and extending longitudinally therebetween, said member extending longitudinally in said vessel, said member having a conductive surface which extends longitudinally along said member, an insulating layer having an interior surface and an exterior surface, said interior surface being disposed on said member encompassing said conductive surface, said insulating layer insulating said conductive surface from the material in said vessel, said conductive surface and said insulating layer defining a first capacitor, the capacitance of which depends upon the level of material in said vessel, the second member having a top and a bottom and extending longitudinally therebetween, said second member also extending longitudinally into said vessel, said second member having longitudinally extending surfaces on opposite sides, said first and second members defining a longitudinally extending space between one of said surfaces of said second member and said exterior surface of said insulating layer on said first member, means for controlling the flow into said space from said vessel, a conductive element disposed in insulated relationship on said second member and extending longitudinally, another insulating layer disposed on said second member and encompassing said conductive element, said conductive element and said insulating layer defining a second capacitor, the capacitance of which depends upon the level of material in said vessel along the surface of said second member opposite to said one of said surfaces thereof.

2. Apparatus according to claim 1 wherein said conductive element is disposed on the surface of said second member opposite to said one surface thereof, said last name surface being disposed facing the wall of said vessel.

3. The apparatus according to claim 1 wherein the effective area of said conductive element along said one of said surfaces of said second member and the area of said conductive surface of said first member are substantially equal.

4. Apparatus according to claim 1 further comprising a third member of insulating material disposed around said first and second members near the top thereof, said first and second members being assembled with said third member, connections to said conductive element and said conductive surface on said first and second members extending through said third member, a conductive terminal attached to said third member, and means for presenting a capacitance corresponding to the stray capacitance affecting said first and second capacitors, said conductive element of said second member being at least as long as said conductive surface of said first member, said flow controlling means extending across the bottom of said second member.

5. Apparatus according to claim 1 wherein said second member is an annular member encompassing said first member.

6. Apparatus according to claim 5 wherein the bottom of said second member extends below the bottom of said first member, and said controlling means is disposed across the bottom of said second member.

7. Apparatus according to claim 6 wherein said first member is cylindrical and of conductive material and has an insulating layer encompassing the outer periphery thereof, said second member is tubular and of insulating material, said first member being disposed within said second member, said one surface of said second member being the inner-periphery of said tubular member, the outer periphery of said tubular member having said conductive element and said another insulating layer thereon, said conductive element of said second member being at least as long as said conductive surface of said first member, said flow controlling means extending across the bottom of said tubular second member.

8. Apparatus according to claim 7 wherein the effective area of the outer periphery of said first member and the area of said conductive element on said second member are substantially equal.

9. A level sensor system which comprises at least one probe means for presenting an output capacitance which varies in accordance with the level of material disposed thereabout, means for converting said output capacitance into a digital output having a value corresponding thereto which comprises a counter for providing said digital output, means for providing a reference voltage having a predetermined voltage magnitude and a charging resistance value corresponding to a predetermined count registered in said counter and for a predetermined level, means for providing an output voltage corresponding to the value of said output capacitance, means for registering counts in said counter during the provision of said output voltage, and means for obtaining said digital output from said counter, said digital output corresponding to the counts registered therein, until said output voltage equals said reference voltage, whereby said digital output is related to said 1 as the counts registered in said counter, until said output voltage equals said reference voltage, and said digital output is related to said predetermined count.

10. The level sensor system according to claim 9 further comprising means for presenting a capacitance corresponding to the component of stray capacitance included in said output capacitance, means for generating an output voltage corresponding to said stray capacitance, and means for inhibiting the registering of counts in said counter until said output voltage corresponding to said stray capacitance equals said reference voltage.

11. A level sensor system according to claim 10 wherein said probe means comprises a member adapted to extend longitudinally into a vessel containing said material, means defining a plate of a capacitor on said member also extending longitudinally of said member, a terminal disposed near the upper end of said member and insulated from said plate, means connected to said plate for obtaining said output capacitance, and means connected to said terminal to obtain stray capacitance.

12. The level sensor system according to claim 9 further comprising means for resetting said counter and enabling said reference voltage generating means to again generate said reference voltage a predetermined time after said output voltage equals said reference voltage.

13. The level sensor system according to claim 9 further comprising a second counter, said probe means having means for presenting a second output capacitance corresponding to the level of material thereabout, means for generating a second output voltage corresponding to the value of said second output capacitance, means for registering counts in said second counter during the generation of said second output voltage, and means for obtaining a second digital output corresponding to the counts registered in said second counter until said second output voltage equals said reference voltage.

14. The level sensor system according to claim 13 comprising a second counter, said probe means having means for presenting a second output capacitance corresponding to the level of material thereabout, means for generating a second output voltage corresponding to the value of said second output capacitance, means for resetting both said counters and enabling said reference voltage generating means to again generate said reference voltage after both said first named and second named output voltages equal said reference voltage.

15. A level sensor system according to claim 13 wherein said probe means are adapted to be disposed in a vessel containing said material comprises a first member having means defining a plate of a capacitor of a first length on a surface thereof, a second member around said first member and having means defining a plate of a capacitor of length at least equal to said first length, said first and second members being adapted to be disposed in a vessel, means contacting said plate of said first member to obtain said first named output capacitance, and means contacting the plate of said second member to obtain said second output capacitance.

16. A level sensor system according to claim 9 wherein said reference voltage generating means comprises a reference capacitor, means for enabling said capacitor to charge and said counter to count, means for sampling and holding the voltage to which said capacitor as charged when said counter reaches said predetermined count to obtain said reference voltage.

17. A level sensor system according to claim 16 wherein said output voltage generating means comprises means for charging said output capacitance after said reference voltage is obtained.

18. A level sensor system according to claim 17 further comprising a circuit for charging said output capacitance and said reference capacitance which presents the same voltage magnitude and the same charging resistance value to said output capacitance and to said reference capacitance.

19. A level sensor system according to claim 18 comprising logic means having two output states, means responsive to said counter reaching said predetermined count for conditioning said logic means into one of said states, means responsive to said output voltage equalling said reference voltage for conditioning said logic means into the other of said states, said means responsive to said counter reaching said predetermined count operating said sampling and holding means, and means coupled to said logic means for discharging said reference capacitance and enabling said output capacitance to charge when said logic means is conditioned into said one of its said states and for discharging said output capacitance and enabling said reference capacitor to charge when said logic means is conditioned into the other of its said states.

20. A level sensor system according to claim 19 wherein said logic means is a flip-flop.

* * * * *